(12) United States Patent  
Strobel

(10) Patent No.: US 7,070,058 B2
(45) Date of Patent: Jul. 4, 2006

(54) HORIZONTAL STACKING COLUMN

(75) Inventor: Gustav Strobel, Saulgau (DE)

(73) Assignee: MTS Maschinenbau GmbH, Mengen (DE)

( * ) Notice: Subject to any disclaimer, the term of this patent is extended or adjusted under 35 U.S.C. 154(b) by 212 days.

(21) Appl. No.: 10/415,224

(22) PCT Filed: Oct. 10, 2001

(86) PCT No.: PCT/EP01/11740

§ 371 (c)(1),
(2), (4) Date: Oct. 27, 2003

(87) PCT Pub. No.: WO02/34649

PCT Pub. Date: May 2, 2002

(65) Prior Publication Data

US 2004/0050813 A1    Mar. 18, 2004

(30) Foreign Application Priority Data

Oct. 27, 2000  (DE) ................................ 100 53 268

(51) Int. Cl.
*A47F 5/08* (2006.01)

(52) U.S. Cl. ........................ 211/150; 211/54.1; 211/169

(58) Field of Classification Search ................ 211/150, 211/183, 168, 13.1, 169, 170, 171, 41.15, 211/70, 41.14, 70.4, 26, 164, 59.4, 184, 49.1, 211/41.1, 149

See application file for complete search history.

(56) References Cited

U.S. PATENT DOCUMENTS

| 1,947,553 | A | * | 2/1934 | Johnston ..................... 211/70.4 |
| 2,619,234 | A | * | 11/1952 | Stone ......................... 211/70.4 |
| 4,549,663 | A | * | 10/1985 | Corbett et al. .............. 211/13.1 |
| 4,733,781 | A | * | 3/1988 | Gerlach ...................... 211/85.8 |
| 5,301,824 | A | * | 4/1994 | Schoeller ..................... 211/150 |
| 5,938,051 | A | * | 8/1999 | Scholler et al. ............. 211/150 |
| 6,223,911 | B1 | * | 5/2001 | Weaver ....................... 211/41.1 |
| 6,234,743 | B1 | * | 5/2001 | Strobel ...................... 414/788.1 |
| 6,405,883 | B1 | * | 6/2002 | Schambach .................. 211/150 |
| 6,626,304 | B1 | * | 9/2003 | Corbett et al. .............. 211/85.8 |

FOREIGN PATENT DOCUMENTS

| DE | 3811310 | * | 10/1989 |
| DE | 4020864 | * | 1/1992 |
| EP | 0536571 | * | 4/1993 |

* cited by examiner

Primary Examiner—Jennifer E. Novosad
(74) Attorney, Agent, or Firm—Bachman & LaPointe, P.C.

(57) ABSTRACT

A horizontal stacking column used to store articles which are placed next to each other at a reciprocal distance on two-armed rachet levers which are rotationally mounted on two axes of rotation between two wall strips, comprising a carrier arm for holding the article to be stored in addition to a control arm. The axes of rotation form an acute angle (w) with the wall strips.

6 Claims, 2 Drawing Sheets

HORIZONTAL STACKING COLUMN

BACKGROUND OF THE INVENTION

The present invention relates to a horizontal stacking column for storing articles one beside the other, at intervals from one another, on two-armed ratchet levers, which are mounted such that they can be rotated on rotary spindles arranged between two wall strips and have, on the one hand, a carrying arm, for retaining the article and, on the other hand, a control arm.

Such stacking columns serve, in particular, for accommodating sheet-like articles, for example for the production of vehicle parts. However, there is also a large number of other application areas which are to be covered by the present invention.

The stacking columns are usually oriented vertically, as are those which are disclosed, for example, in DE 38 11 310.

The prior art also discloses sloping stacking columns, for example in EP 0 536 571. In this case, two wall strips are connected at an acute angle to a base surface, base plate or the like. The ratchet levers are arranged on the rotary spindles, between the two wall strips, vertically one after the other such that they are offset laterally in the same direction.

DE 40 20 864 C2, however, discloses a horizontally arranged stacking column or storage rail of the above-mentioned type in the case of which the wall strips are oriented vertically one beside the other. The rotary spindle for the ratchet is located, approximately horizontally, between the two wall strips. In the use position, the ratchets project upward out of the wall strip. The ratchet has control elements by means of which a following ratchet in each case is moved into the standby position.

In a fair number of cases, it is desirable for the article which is to be stored not to stand on the wall strips, and for the ratchet levers to act laterally on the article. The horizontal stacking column which has just been described is not suitable for this case.

The object of the present invention is to develop a horizontal stacking column of the above-mentioned type in the case of which the article does not come into contact with the wall strips, in particular does not stand on the wall strips, and in the case of which, the ratchet levers act laterally on the article.

SUMMARY OF THE INVENTION

In order to achieve this object, the rotary spindles enclose an acute angle with the wall strips.

This means that the ratchet lever is positioned in an approximately sloping manner overall. The wall strips themselves are arranged parallel and horizontally one above the other.

The significant advantage of the present invention is that the ratchet levers drop back automatically into their rest position again. The control arm preferably has a higher weight than the carrying arm. For this purpose, the control arm itself may additionally be provided with a higher weight, in particular if the ratchet lever is one made of plastic or aluminum. In this case, the control arm may be provided with a higher-weight metal element. The sloping arrangement of the ratchet lever ensures that the latter drops back into its rest position again once the article has been removed. It is merely in the case of the first ratchet lever that this is avoided by a stop pin, with the result that the first ratchet lever is always kept in the standby position.

The way in which the individual ratchet levers interact in order that, when one ratchet lever pivots into the operating position, the following ratchet lever always passes into the standby position is not important in the present case. The prior art discloses many different possibilities for this, and these are to be covered by the present invention.

In addition, the present invention also provides a sensor for detecting the loading state of the stacking column. At the moment when the last ratchet lever pivots into the operating position, this is determined by a sensor. For example, in this case, this may be a straightforward hole which is located in an end surface of the stacking column and is closed or obscured by an angle element actuated by the last ratchet lever or by the latter itself. This is then detected by an optical or mechanical sensor.

BRIEF DESCRIPTION OF THE DRAWINGS

Further advantages, features and details of the invention can be gathered from the following description of preferred exemplary embodiments and with reference to the drawing, in which.

DETAILED DESCRIPTION

Figure 1:
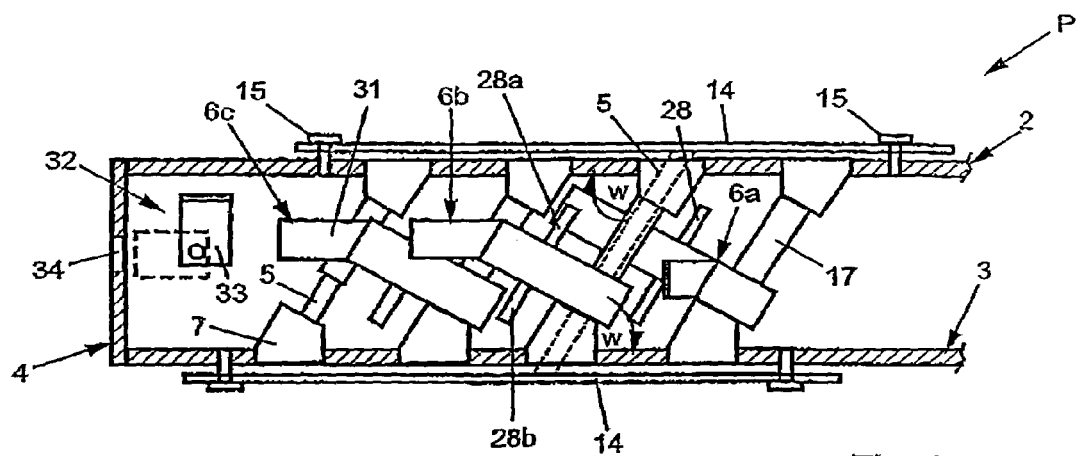
FIG. 1 shows a side view of part of a stacking column according to the invention.
Figure 2:
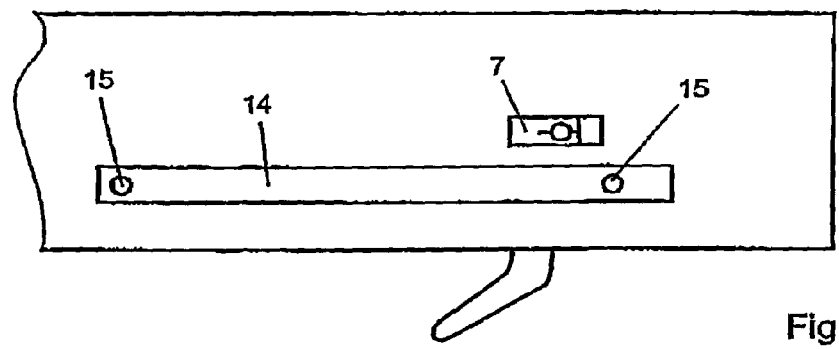
FIG. 2 shows a plan view of the stacking column according to FIG. 1.

According to FIG. 1, two wall strips 2 and 3 are arranged parallel and horizontally one above the other and are connected to one another on the end sides by end walls 4. The wall strips 2 and 3 have rotary spindles 5 passing through them at certain intervals, the rotary spindles enclosing acute angles w with the wall strips 2 and 3. The rotary spindles 5 are thus positioned in a sloping manner.

Only four rotary spindles 5 are shown in the present exemplary embodiment, it being possible to increase the number of rotary spindles 5 as desired, and this number being dependent on the length of the wall strips 2 and 3.

Each rotary spindle 5 retains a ratchet lever 6, three ratchet levers 6a, 6b and 6c being illustrated in the present exemplary embodiment. The ratchet levers serve for securing an article (not shown specifically).

Figure 6:
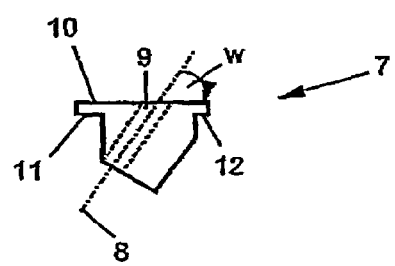
FIG. 6 shows a plan view of a fastening element for ratchet levers and, if appropriate, a stop pin.

For the purpose of fastening the rotary spindles 5, use is made of fastening elements 7, as are shown in particular in FIG. 6. Each fastening element 7 has a bore 9, into which the rotary spindle 5 is inserted in the use position. This bore 9 has an axis B which runs at an angle w to a rear wall 10 and to stop surfaces 11 and 12 which are formed by shoulders of the fastening element 7.

In the use position, such fastening elements 7 are inserted into corresponding recesses 13 of each wall strip 2, 3, the stop surfaces 11 and 12 butting against said wall strips 2 and 3 from the outside and thus also limiting the insertion depths of the fastening element 7. Two mutually opposite fastening elements 7 here are inserted into the recesses 13 in a state in which they have been rotated through 180° in relation to one another. The rotary spindle 5 extends between them.

Figure 5:
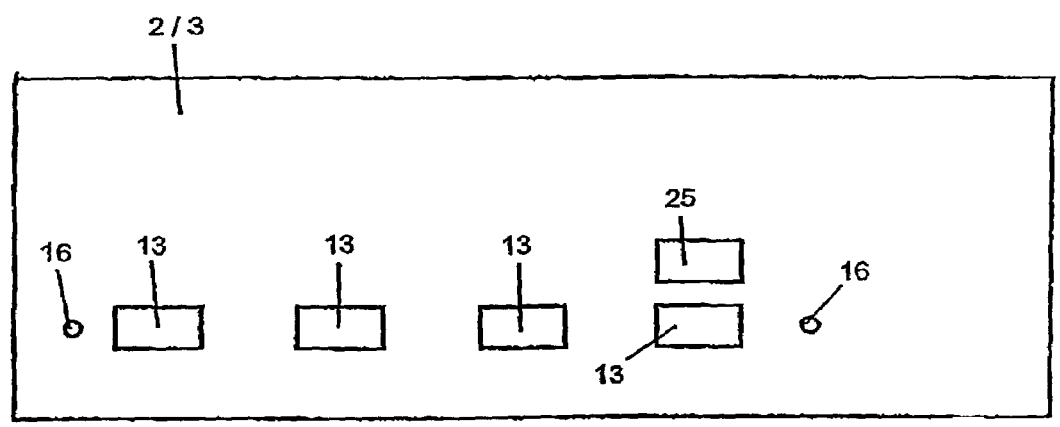
FIG. 5 shows a plan view of a wall strip prior to the insertion of ratchet levers and corresponding fastening elements.

A bar 14 serves for securing a plurality of fastening elements 7, the bar, in the use position, butting against the rear wall 10 of a plurality of fastening elements 7 and being connected to a wall strips 2 and 3 by corresponding screws 15. In this case, these screws 15 engage in corresponding internally threaded bores 16 (FIG. 5). Of course, it is also conceivable for the fastening elements to be adhesively bonded or secured in some other way on the wall strips.

The fastening elements 7 allow the rotary spindle 5 to be arranged quickly in the same way, assembly, in particular, being made considerably easier. The fastening elements 7 are inserted into the recesses 13. As soon as a fastening element 7 has been inserted into its recess 13 from one side, the rotary spindle 5 is pushed into the bore 9, and then a spacer sleeve 17 is pushed onto the rotary spindle 5 and, thereafter, the ratchet levers 6 is positioned on the free region of the rotary spindle 5. From the other side, a corresponding fastening element 7, which has been rotated through 180°, is then inserted into the corresponding recess 13 and accommodates the rotary spindle 5 in its bore 9. Once a plurality of ratchet levers 6 has been arranged in this way along the stacking column P, the fastening element 7 or a certain number of fastening elements 7 are fixed definitively in position by the bars 14.

Figure 3:
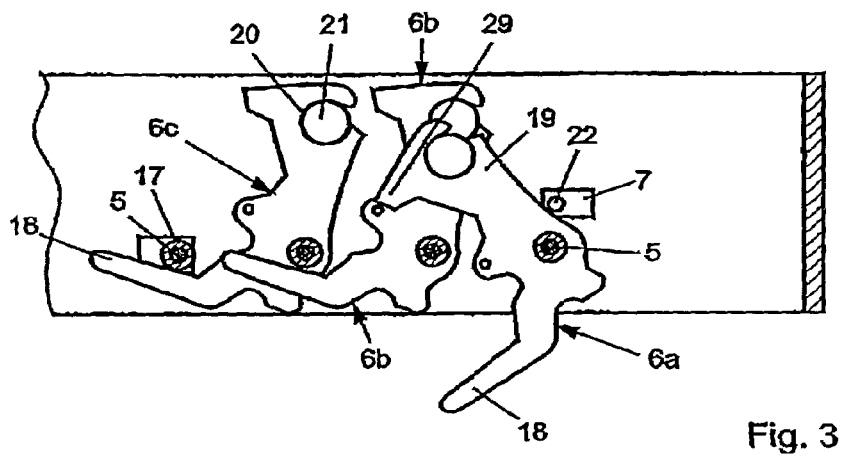
FIG. 3 shows a view of the stacking column corresponding to FIG. 2, but once a top wall strip has been removed.
Figure 4:
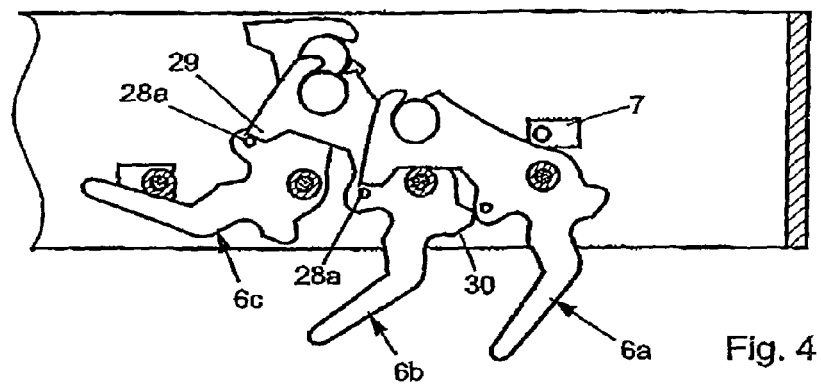
FIG. 4 shows a view of a stacking column corresponding to FIG. 3, but in a further use position.

It can be seen in FIGS. 3 and 4 that each ratchet lever comprises a carrying arm 18 and a control arm 19. The arms 18 and 19 are each arranged on one side of the rotary spindle 5. However, the control arm 19 has a higher weight than the carrying arm 18, it being additionally possible here for an additional weight 21 to be inserted into the corresponding recess 20 of the control arm 19. For the sake of simplicity, the recess 20 is formed by a bore in the control arm 19, the recess being open. It is possible here for the control arm, in the case of fitting inaccuracies, with the weight 21, to yield to a limited extent, this facilitating the insertion of the weight 21 by the weight 21 being pressed into the recess 20.

By virtue of the weight distribution and/or the additional weight 21, each ratchet lever, apart from the first ratchet lever 6a, is normally located in the rest position, as is indicated for the ratchet levers 6b and 6c in FIG. 3. The ratchet levers 6b and 6c are retained in this rest position in that the carrying arm 18 strikes either against a fastening element 7 located alongside it or else against the rotary spindle 5 or the spacer sleeve 17. In this rest position, the ratchet lever 6b or 6c always disappears between the wall strips 2 and 3, with the result that the operation of loading the stacking column P is not disrupted.

The first ratchet lever 6a, in contrast, is always located in the standby position, in which the carrying arm 18 has been pivoted out of the region of the wall strips 2 and 3. A stop pin 22 is provided for the purpose of securing the ratchet lever 6a in this standby position, the stop pin likewise being retained between the two wall strips 2 and 3 by, for example, fastening elements 7 (see FIG. 6) in a recess 25 (see FIG. 5).

Each ratchet lever 6 also has a control pin 28, which passes through the ratchet lever 6 and projects beyond the same on both sides. One part 28a of the control pin 28 interacts with one following ratchet lever and the other part 28b interacts with the other following ratchet lever. It can be seen that the lowermost ratchet lever 6a interacts, by way of a nose 29 of its control arm 19, with one part 28a of the control pin 28 of the following ratchet lever 6b. If the first ratchet lever 6a is pivoted from its standby position into an operating position, as is indicated in FIG. 4, then the nose 29 presses on the control pin 28a and pivots the following ratchet lever 6b into the standby position.

If, then, this ratchet lever 6b is charged with an article, it likewise pivots into the operating position, in which case the nose 29 of its control arm 19, in turn, presses on the control pin 28a and pivots the following ratchet lever 6c into the standby position. At the same time, however, the ratchet lever 6b engages, by way of a control edge 30, over the other part 28b of the control pin 28 of the lowermost ratchet lever 6a and presses thereon, with the result that this first ratchet lever is fixed in its operating position.

If, furthermore, the ratchet lever 6c is then loaded, its control edge interacts with the control pin 28 of the ratchet lever 6b for locking purposes. This functioning can be continued as desired.

During unloading, the action of the respective ratchet lever dropping back also results in the following ratchet lever immediately unlocking, with the result that the latter, in turn, during unloading, can drop back into its standby position and, thereafter, into its rest position.

For better abutment of the articles against the ratchet lever, at least part 31 of the ratchet lever, as is illustrated in FIG. 1, should be of angled design, with the result that this part forms an approximately planar abutment surface. In addition, however, the shape of the article which is to be retained is essentially also important as far as the configuration of the ratchet lever is concerned.

FIG. 1, furthermore, indicates a sensor 32 via which the loading state of the stacking column P can be determined. In the exemplary embodiment shown, the sensor 32 is an angle element 33 which can be pivoted in front of a hole 34 in the end wall 4. The hole 34 is thus closed or obscured, with the result that both an optical and a mechanical sensor can determine the loading state of the stacking column P at any one time. The angle element 33 can be pivoted, for example, by a lever which is connected to the last ratchet lever. The last ratchet lever may also actuate some other element for the purpose of initiating the pivoting action of the angle element. It is even conceivable for, for example, part of the control arm of the last ratchet lever to be configured such that it closes the hole 34 in the operating position.

The invention claimed is:

1. A horizontal stacking column comprising:
   a pair of spaced apart wall strips comprising a first horizontally extending wall strip and a second horizontally extending wall strip vertically spaced from the first horizontally extending wall strip;
   a plurality of rotary spindles extending between the pair of wall strips along an axis (B), wherein the axis (B) intersects the wall strips at an acute angle (w); and
   a rachet lever rotatably mounted on at least one of the plurality of rotary spindles, said rachet levers having a carrying arm portion and a control arm portion.

2. The stacking column as claimed in claim 1, wherein the wall strips are arranged substantially parallel and horizontally one above the other.

3. The stacking column as claimed in claim 1, wherein the control arm portion is greater in weight than the carrying arm portion.

4. The stacking column as claimed in claim 1, wherein the carrying arm portion includes a horizontally extending, angled part.

5. The stacking column as claimed in claim 1, wherein a sensor is provided on the stacking column for detecting a loading state of the stacking column.

6. The stacking column as claimed in claim 5, wherein the wall strips are connected by at least one end wall, wherein a hole is formed in the end wall and is aligned with the sensor.

\* \* \* \* \*